(12) United States Patent
Nakamura et al.

(10) Patent No.: US 6,387,570 B1
(45) Date of Patent: May 14, 2002

(54) LITHIUM SECONDARY BATTERY, POLYMER GEL ELECTROLYTE AND BINDER FOR USE IN LITHIUM SECONDARY BATTERIES

(75) Inventors: Takayuki Nakamura; Tadashi Ino, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/486,060

(22) PCT Filed: Aug. 21, 1998

(86) PCT No.: PCT/JP98/03714

§ 371 Date: Feb. 22, 2000

§ 102(e) Date: Feb. 22, 2000

(87) PCT Pub. No.: WO99/10946

PCT Pub. Date: Mar. 4, 1999

(30) Foreign Application Priority Data

Aug. 22, 1997 (JP) .............................. 9-226177

(51) Int. Cl.[7] .............................................. H01M 6/14
(52) U.S. Cl. ...................................... 429/300; 429/303
(58) Field of Search ................................. 429/304, 306, 429/307, 309, 316, 300, 303

(56) References Cited

U.S. PATENT DOCUMENTS

| | | | |
|---|---|---|---|
| 5,196,484 A | * 3/1993 | Giles et al. ................. | 525/314 |
| 5,424,150 A | * 6/1995 | Ohnishi et al. ............. | 429/192 |
| 5,523,180 A | 6/1996 | Armand et al. | |
| 5,548,055 A | 8/1996 | Narang et al. | |
| 5,900,183 A | * 5/1999 | Kronfli et al. ............. | 252/62.2 |
| 6,037,080 A | * 3/2000 | Kronfli et al. ............. | 429/188 |

FOREIGN PATENT DOCUMENTS

| | | |
|---|---|---|
| EP | 0 214 880 A1 | 3/1987 |
| EP | 0585162 A1 | 3/1994 |
| EP | 0 600 117 | 6/1994 |
| GB | 2 309 701 A | 8/1997 |
| JP | 4-323260 | 11/1992 |
| JP | 6-275320 | 9/1994 |
| JP | 07 109321 | 4/1995 |
| JP | 09 92328 | 4/1997 |
| WO | WO 88/03154 | 5/1988 |
| WO | WO 93/26057 | 12/1993 |

* cited by examiner

Primary Examiner—Stephen Kalafut
Assistant Examiner—R. Alejandro
(74) Attorney, Agent, or Firm—Larson & Taylor PLC

(57) ABSTRACT

The invention provides a polymer gel electrolyte or a binder for use in lithium secondary batteries which comprises a copolymer having in the molecule both a segmented polymer chain (a) having the function of retaining membrane strength and a segmented polymer chain (b) having the function of holding a nonaqueous electrolyte. Also provided is a lithium secondary battery containing the electrolyte.

4 Claims, 1 Drawing Sheet

LITHIUM SECONDARY BATTERY, POLYMER GEL ELECTROLYTE AND BINDER FOR USE IN LITHIUM SECONDARY BATTERIES

TECHNICAL FIELD

The present invention relates to polymer gel electrolytes for use in lithium secondary batteries, lithium secondary batteries incorporating the electrolyte, and binders for use in lithium secondary batteries.

BACKGROUND ART

In recent years, there is a growing demand for precision electric or electronic devices which are small-sized and suitable for portable use, such as audio tape recorders, camera-incorporating video tape recorders, personal computers and cellular phones. This trend entails a further demand for so-called secondary cells or batteries which are compact, lightweight and rechargeable and have a high energy density for use in these devices as drive power sources. New secondary batteries of high performance including nickel-hydrogen batteries and lithium batteries have been made commercially available in addition to the conventional lead storage batteries and nickel-cadmium secondary batteries.

Much has recently been expected of high-performance secondary cells or batteries for the amelioration of environmental problems such as the reduction of $CO_2$ emissions and air pollution control. Stated more specifically, electric vehicles (EVs) and so-called load conditioners for the purpose of leveling off the load of power supply are expected to be promising. EVs are adapted to obtain powder mainly from the electric energy stored in secondary batteries. It is not too much to say that the performance of the EV is dependent on the energy density of the secondary battery installed in the vehicle. The load conditioner is designed to accumulate excessive electric power of nighttime in secondary batteries, which are discharged for use in the daytime in the event of a power shortage. Such load conditioners need to be installed in individual buildings and must have a high energy density because the space available is limited.

Characteristic of these uses is that high-performance secondary batteries of large size are generally required. A high safety level is also required of high-performance batteries of great size because of the large quantities of energy stored therein.

Among the new secondary cells or batteries, expectations are great for lithium secondary cells or batteries wherein the negative electrode comprises metallic lithium, lithium alloy, or a compound capable of absorbing and desorbing lithium ions because of their high energy density.

Secondary batteries generally comprise a negative electrode, positive electrode, electrolyte (liquid electrolyte) having ionic conductivity and separator for preventing short-circuiting between the negative and positive electrodes. Lithium secondary batteries have incorporated therein a nonaqueous electrolyte, i.e., solution of a lithium salt in a carbonic acid ester or like organic solvent. The nonaqueous electrolyte is substantially inflammable and therefore involves the hazard of burning or explosion at all times, hence the importance of countermeasures for assuring safety.

Especially, the separator serves to prevent short-circuiting between the negative and positive electrodes, also has the function of holding the electrolyte within the battery system with good stability and is accordingly the most important component in ensuring safety.

The separators which are most prevalently used at present are porous membranes of a hydrocarbon polyolefin resin such as polyethylene or polypropylene. These membranes have the so-called shutdown function of closing the pores when the resin melts at a high temperature of not lower than the melting point, and are capable of preventing the rupture of the battery due to an abnormal reaction. Such polyolefin resins nevertheless still remain to be improved in their ability to retain the electrolyte and are likely to permit the electrolyte to seep out of the battery can, hence the hazard of electrolyte leakage.

Proposals have been made of rendering the surface of polyolefin resin hydrophilic as by a treatment with plasma, and improving the electrolyte retentivity with use of a surfactant, whereas these methods have yet to be improved in effectiveness.

Although attempts have been made to dispense with liquid electrolytes, that is, to use a solid electrolyte in place of the liquid electrolyte, solid electrolytes have the drawback of failing to afford a great discharge current due to low electric conductivity and have not been placed into actual use.

Accordingly, attention has been directed to so-called "polymer gel electrolytes" which are improved in electrolyte retentivity by incorporating as a separator a resin which swells in a nonaqueous liquid electrolyte. The characteristics required of polymer gel electrolytes include:

(1) high ability to retain the liquid electrolyte and high lithium ion conductivity, (2) being readily available in the form of a thin membrane which has sufficient strength for use in the battery, (3) chemical stability, especially high stability against oxidation, in the battery reaction system, and (4) thermal stability for use at high temperatures.

Although extensive research is presently conducted on polyethylene oxide, polypropylene oxide and like polyether resins for use as polymer gel electrolytes, these resins are not fully satisfactory in the characteristics (1), still remaining to be improved in battery performance and safety.

Fluorine-containing polymers are generally outstanding in chemical and thermal stabilities and are thought to be of high potential ability as gel electrolytes fulfilling the requirements (3) and (4).

For example, U.S. Pat. No. 5,418,091 proposes a copolymer of vinylidene fluoride (2F) and hexafluoropropylene (6F) for use as a gel electrolyte. The process disclosed in this patent affords a gel electrolyte which is stable in the battery system. However, the 2F/6F copolymer varies greatly in physical properties depending on the proportion of 6F. For example, a high 6F proportion provides high electrolyte retentivity and high ionic conductivity but gives impaired strength to the membrane, which becomes partly dissolved in the electrolyte in an extreme case. In fact, we have found that when having a 2F/6F ratio of 78/22 in mole ratio, the copolymer dissolves in an electrolyte (mixture of equal portions of propylene carbonate (PC) and ethylene carbonate (EC)). Conversely, a reduced proportion of 6F results in enhanced membrane strength but entails the drawback of insufficient electrolyte retentivity and low electric conductivity. Thus, it is difficult for the copolymer to meet both the characteristics requirements (1) and (2). When 95/5 in 2F/6F mole ratio, the copolymer is still soluble in the electrolyte (mixture of equal portions of PC and EC), so that it is infeasible that a membrane swollen with an electrolyte under the conditions claimed in the U.S. Patent (6F/2F copolymer containing 8 to 25 wt. %, i.e., 4 to 12.5 mole %, of 6F) fulfill the foregoing requirement (2).

We have conducted intensive research and succeeded in fulfilling all the foregoing characteristics requirements (1) to (4) by using as a polymer gel electrolyte a polymer the molecule of which has a site having the function of retaining membrane strength and also a site having the function of being wettable with a liquid electrolyte.

The present invention provides a polymer gel electrolyte and a binder for use in lithium secondary batteries and lithium secondary batteries incorporating these components. More particularly, an object of the invention is to provide a polymer gel electrolyte having high ability to retain a liquid electrolyte and satisfactory membrane strength and a binder for use in lithium secondary batteries, and lithium secondary batteries comprising these components.

DISCLOSURE OF THE INVENTION

Figure 1:
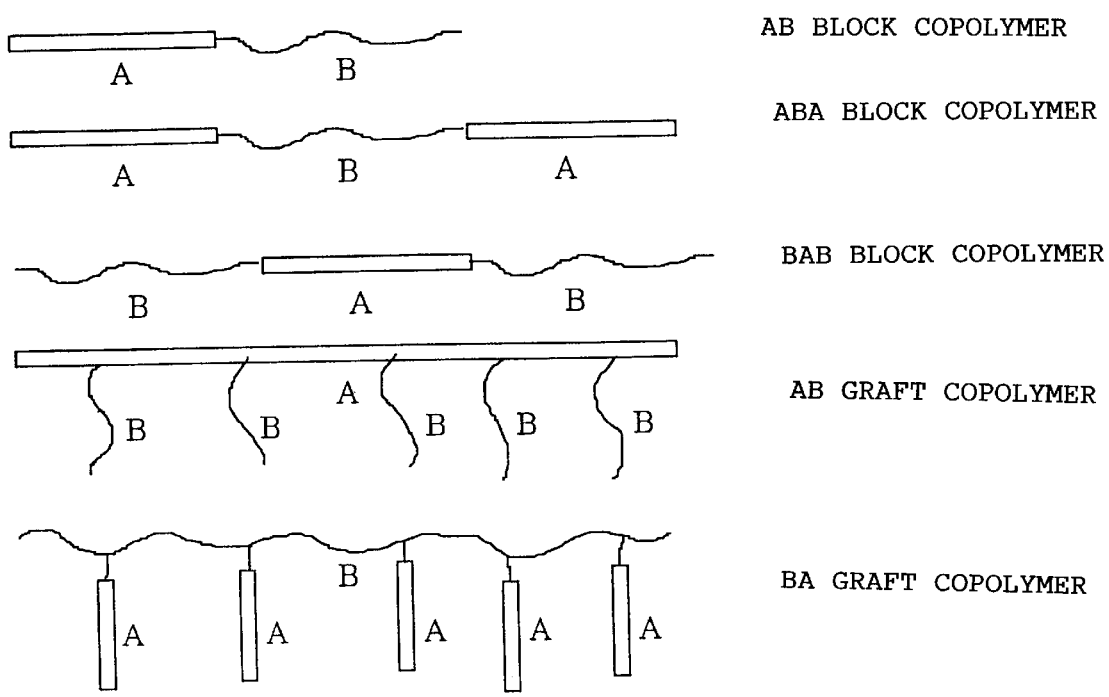
FIG. 1 is a diagram schematically showing polymers comprising a segmented polymer chain A having the function of retaining membrane strength and also a segmented polymer chain B having the function of being wettable with a liquid electrolyte.

Since gel electrolytes retain an organic solvent serving as a liquid electrolyte, it is generally required to select as the gel electrolyte a polymer which is compatible with the organic solvent. This inevitably means that the polymer readily swells or dissolves in the liquid electrolyte. Because the polymer lowers in mechanical strength when swollen with a solvent, swelling inevitably impairs the membrane strength of the gel electrolyte. The conventional gel electrolytes have a definite composition and therefore have the problem of becoming impaired in membrane strength when given higher ability to retain the liquid electrolyte. This is the reason why the requirements (1) and (2) can not be fulfilled at the same time.

Accordingly we thought this problem soluble by forming a gel electrolyte by mixing components which individually meet the characteristics requirements (1) and (2). More specifically, we made an attempt to prepare an electrolyte membrane from a mixture of a polymer, such as polyvinylidene fluoride, which has difficulty in swelling with liquid electrolytes and a polymer, such as a fluorocarbon rubber, which easily swells with liquid electrolytes. When wetted with the liquid electrolyte, the membrane was found apparently low in strength, exhibiting no improvement. We thought this attributable to the phenomenon that the liquid electrolyte becomes incorporated preferentially into the polymer which readily swells, possibly dissolving the polymer in an extreme case.

To fulfill the object in view of this problem, we found it necessary to design a gel electrolyte by uniting on the molecular level a polymer having difficulty in swelling with liquid electrolytes and having mechanical strength even in the liquid electrolyte with a polymer which easily swells in liquid electrolytes and having high ability to retain the liquid electrolyte. This finding has matured to the present invention.

The present invention relates to a polymer gel electrolyte for use in secondary batteries which contains a polymer having in the molecule both a segmented polymer chain (a) having the function of retaining membrane strength and a segmented polymer chain (b) having the function of becoming wet with a liquid electrolyte.

The present invention further relates to a lithium second battery comprising the polymer gel electrolyte mentioned above, and further containing:

(1) a lithium salt which can be dissociated and is selected from the group consisting of $LiPF_6$, $LiBF_4$, $LiClO_4$, $LiAsF_6$, $LiCF_3SO_3$, $Li(CF_3SO_2)_2N$, $Li(CF_3SO_2)_3C$ and $LiSbF_6$, and (2) a solvent selected from among ethylene carbonate, propylene carbonate, butylene carbonate, dimethyl carbonate, diethyl carbonate, methylethyl carbonate, dipropyl carbonate, γ-butyrolactone, dimethoxyethane, diethoxyethane and mixtures of such solvents.

The invention further relates to a binder for use in lithium secondary batteries which contains a polymer having in the molecule both a segmented polymer chain (a) having the function of retaining membrane strength and a segmented polymer chain (b) having the function of becoming wet with a liquid electrolyte (function of holding a nonaqueous electrolyte).

The present invention will be described below in greater detail.

Examples of polymers having in the molecule both a segmented polymer chain (a) having the function of retaining membrane strength and a segmented polymer chain (b) having the function of holding a nonaqueous electrolyte are block copolymers and graft copolymers shown in FIG. 1. The block copolymer can be prepared conventionally by various processes, for example, the successive elongation process for use in producing living polymers (styrene-butadiene-styrene copolymers) by ion polymerization, and the polymer coupling process for coupling at least two kinds of polymers. For polyaddition, polycondensation or radical polymerization with use of a terminal functional group, also known are processes wherein a polymerization initiator or polymerization transfer agent is used (AB, ABA or BAB block copolymers). On the other hand, the graft copolymer is produced by preparing a new polymerization initiating point at the site or sites of the main-chain polymer and grafting other monomer onto this point for polymerization. For radical polymerization, it is known to generate a polymer radical by removing hydrogen or a halogen from the main-chain polymer with an initiator, or to copolymerize a monomer having an initiator site with the main chain first and graft-polymerize other monomer with the resulting copolymer in the second stage, with the initiator site activated. Recently available is a process for preparing a graft copolymer at a time by copolymerizing macromers (AB or BA graft copolymer).

Fluorine-containing polymers are desirable as polymers fulfilling the requirements (1) to (4) for use as in polymer gel electrolytes for lithium secondary batteries. Fluorine-containing polymers are more stable thermally and chemically than common hydrocarbon polymers. Further when fluorine-containing monomers is used for preparing copolymers, the wettability of the copolymer with the electrolyte is readily controllable and the strength of membrane of the copolymer is also controllable by adjusting the composition thereof. The fluorine-containing polymers are desirable for these reasons.

Using fluorine-containing monomers, block and graft copolymers can be prepared by known processes. As disclosed, for example, in JP-B No. 4728/1983, a block copolymer of the AB or ABA type can be prepared using an iodide compound R-I or I-R-I wherein R is a hydrocarbon, especially a hydrocarbon halide in which the halogen atom is chiefly fluorine or chlorine.

The ratio of the segmented polymer chain (a) to the segmented polymer chain (b), i.e., the ratio of the segment (a) to the segment (b), a:b, is 5–95:95–5 in wt. %, preferably 5–50:95–50 in wt. %.

From the viewpoint of stability in the battery system, it is preferable to use a fluorocarbon resin as the segmented polymer chain (a). The fluorocarbon resin consists predominantly of vinylidene fluoride and tetrafluoroethylene. Further copolymerizable with these monomers is a comonomer, such as hexafluoropropylene or vinyl ether perfluoride when so required. Stated more specifically, preferable is a vinylidene fluoride copolymer comprising 50 to 100 mole % of vinylidene fluoride, 0 to 50 mole % of tetrafluoroethylene and 0 to 10 mole % of a monomer copolymerizable with these monomers, the combined mole fraction $X_t$ of vinylidene fluoride and tetrafluoroethylene copolymerized being in the range of $90 \leq X_t \leq 100$.

When the proportion of vinylidene fluoride is less than about 50 mole %, reduced solubility in the whole organic solvent will result. Presumably, the copolymer material then becomes harder and less flexible, imposing limitations to the winding of the electrode sheets into a small roll and to the folding thereof, and also presenting difficulty in improving the performance of the battery. It is desired that the copolymer be 20,000 to 1,000,000 in weight average molecular weight calculated as polystyrene and as determined by GPC (gel permeation chromatography). If less than 20,000, the molecular weight is too low, rendering it impossible to make the copolymer into a membrane, whereas if the molecular weight is over 1,000,000, the electrode coating composition becomes markedly thixotropic and difficult to handle. Examples of other segmented polymer chains (a) are given below.

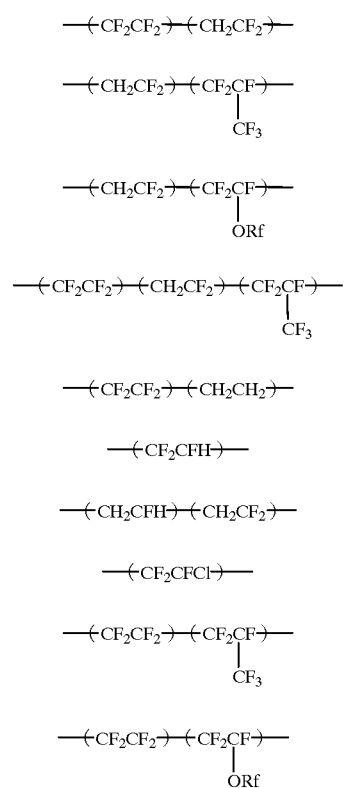

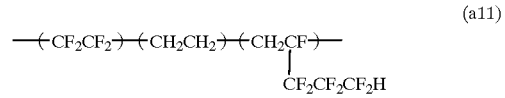

In the above formulae, Rf is $C_nF_{2n+1}$ (wherein n is an integer of not smaller than 1) or $C_nF_{2n+1}(OCF(CF_3)CF_2)_m$ (wherein n is an integer of not smaller than 1, and m is an integer of not smaller than 1).

The polymer chain (a1) comprises preferably at least 50 mole % to less than 100 mole % of $CH_2CF_2$. The polymer chain (a2) comprises preferably about 0 to about 5 mole % of $CF_2CF(CF_3)$. The polymer chain (a4) comprises preferably less than about 3 mole % of $CF_2CF(CF_3)$. The polymer chain (a5) comprises preferably about 50 to about 60 mole % of $CF_2CF_2$. The preferred segmented polymer chains (a) are (a1), (a2) and (a5).

The segmented polymer chain (b) is not limited specifically insofar as it can be swollen smoothly in liquid electrolytes. For example, such a polymer chain consists predominantly of vinylidene fluoride and hexafluoropropylene. Further copolymerizable with these monomers is a comonomer, such as tetrafluoroethylene or vinyl ether perfluoride when so required. More specifically, preferable is a copolymer comprising 50 to 95 mole % of vinylidene fluoride, 5 to 30 mole % of hexafluoropropylene and 0 to 40 mole % of tetrafluoroethylene, the combined mole fraction $X'_t$ of vinylidene fluoride and hexafluoropropylene copolymerized being in the range of $60 \leq X'_t \leq 100$. Examples of other segmented polymer chains (b) are as follows.

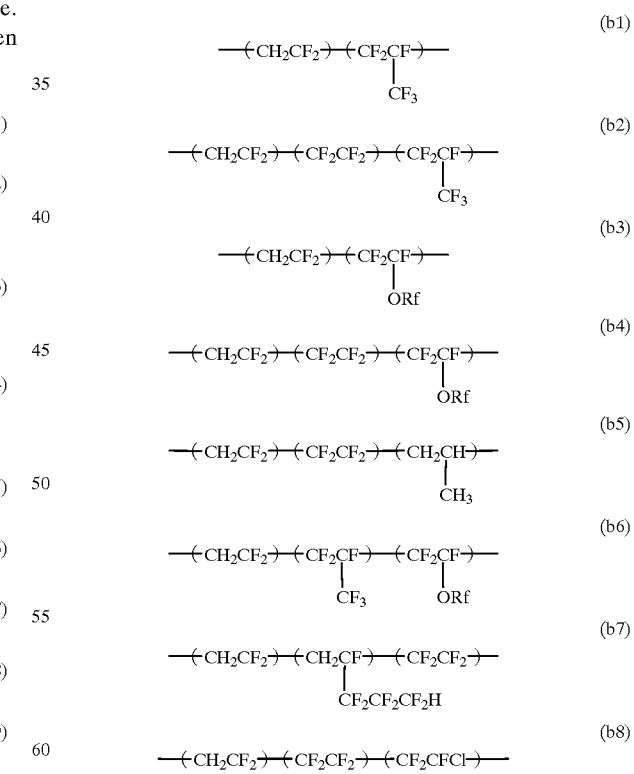

Rf in the formulae are as defined above.

The polymer chain (b1) comprises preferably about 10 mole % to about 50 mole % of $CF_2CF(CF_3)$. The polymer chain (b7) may contain no $CF_2CF_2$. The preferred segmented polymer chains (b) are (b1) and (b2).

In the case where the segment (a) and the segment (b) are copolymers consisting mainly of vinylidene fluoride and hexafluoropropylene, it is desired that the segment (b) be greater than the segment (a) in hexafluoropropylene content.

The same monomer may be used for the segment (a) and the segment (b). In this case, the segment (b) to be selected preferably has a composition easily permitting swelling because the liquid electrolyte tends to be contained preferentially in the polymer chain which can be swollen easily.

Although the arrangement of segmented polymer chains (a) and segmented polymer chains (b) in the molecule is not limited particularly, the molecule may contain at least one segment (a) and at least one segment The solvent to be used in the present invention is not limited specifically. Examples of solvents usable are ethylene carbonate, propylene carbonate, butylene carbonate and like cyclic carbonates, dimethyl carbonate, diethyl carbonate, methylethyl carbonate, dipropyl carbonate and like chain carbonates, γ-butyrolactone and like cyclic esters, dimethoxyethane, diethoxyethane and like chain ether compounds. These solvents are usable singly, or in combination of at least two of them. Usable as the lithium salt which can be dissociated is any of electrolytes heretofore known, such as $LiClO_4$, $LiAsF_6$, $LiPF_6$, $LiBF_4$, $LiCl$, $LiBr$, $LiCH_3SO_3$, $LiCF_3SO_3$, $Li(CF_3SO_2)_2N$, $Li(CF_3SO_2)_3C$ and $LiSbF_6$.

The battery electrode composition of the present invention may further have admixed therewith an acrylic resin, such as polymethacrylate or polymethyl methacrylate, polyimide, polyamide or polyamidoimide resin so as to be given improved adhesion to the current collector. The composition may have incorporated therein an electrolyte such as lithium perchlorate, lithium borofluoride or cesium carbonate, or a solution of these electrolytes as dissolved singly or in combination in propylene carbonate, ethylene carbonate, diethyl carbonate, γ-butyrolactone or the like.

The negative electrode active material to be used, although not limited specifically, is a carbonaceous material which can be doped or dedoped with metallic lithium or lithium ions. Examples of preferred materials are polyacene, polypyrrole and like electrically conductive polymers, coke, carbonized polymer, carbon fiber, etc. Also useful are pyrolytic carbons which are great in energy density per unit volume, cokes (petroleum coke, pitch coke, coal coke and the like), carbon black (acetylene black, etc.), vitreous carbon, sintered bodies of organic polymer materials (obtained by sintering organic polymer materials at a temperature of at least 500° C. in an inert gas stream or in a vacuum), carbon fiber, etc.

Although not limited particularly, the positive electrode active material to be used is, for example, a transition metal oxide such as manganese dioxide or vanadium pentoxide, transition metal sulfide such as iron sulfide or titanium sulfide, or double oxide of such a metal and lithium. From the viewpoint of high voltage and high energy density available and excellent cycle characteristics, especially useful is a double oxide represented by the formula $LiXA_1$-$YMYO_2$ wherein A is at least one transition metal element selected from the group consisting of Mn, Co and Ni, M is at least one element selected from the group consisting of B, Mg, Ca, Sr, Ba, Ti, V, Cr, Mn, Fe, Co, Ni, Al, In, Nb, Mo, W, Y and Rh, $0.05 \leq X \leq 1.1$ and $0 \leq Y \leq 0.5$. More specific examples of preferred double oxides are $LiCoO_2$, $LiNiO_2$ and $LiMn_2O_4$.

The polymer for use as the polymer gel electrolyte of the invention is usable also as a binder for preparing electrodes, especially as a binder for positive electrodes.

The binder is used in an amount of about 1 to about 10 wt. % based on the combined amount of the positive electrode active material and electrically conductive agent.

The solvent to be mixed with the binder is an aprotic polar solvent, such as N-methylpyrrolidone, which is generally used in lithium ion batteries. Also useful are other solvents such as methyl ethyl ketone, methyl isobutyl ketone and like ketone solvents.

The lithium secondary battery containing the binder and the polymer gel electrolyte of the invention are desirable because of high compatibility of these two components.

BEST MODE OF CARRYING OUT THE INVENTION

The present invention will be described below in greater detail with reference to preparation examples, examples and comparative examples. However, the invention is not limited to these examples.

PREPARATION EXAMPLE 1

A block copolymer of the segment (a)-segment (b) type was prepared from polyvinylidene fluoride used as the segmented polymer chain (a) and a copolymer of 2F (vinylidene fluoride)/6F (hexafluoropropylene) in the ratio of 80/20 used as the segmented polymer chain (b).

Into a pressure-resistant reactor with a capacity of 3000 ml were placed 1500 ml of pure water and 7.5 g of ammonium perfluorooctanoate, the air in the interior space was fully replaced with a gas mixture of 2F (vinylidene fluoride)/6F (hexafluoropropylene) (45/55 in mole ratio), and the gas mixture was thereafter supplied to the reactor to a pressure of 14 kg/cm$^2$ G. A 0.5 ml quantity of $I(CF_2)_4I$ (25° C.) was placed in, the temperature was adjusted to 80° C. with stirring, and 10 ml of 10% aqueous solution of APS was forced into the reactor. This immediately initiated a polymerization reaction to result in a pressure drop, so that a gas mixture of 2F (vinylidene fluoride)/6F (hexafluoropropylene) (80/20 in mole ratio) was supplied again to a pressure of 15 kg/cm$^2$ G upon the pressure dropping to 13 kg/cm$^2$ G. Continued polymerization was thereafter effected while maintaining the pressure in the range of 13 to 15 kg/cm$^2$ G in this way. Six hours later, the reaction system was rapidly cooled and relieved of pressure to discontinue the polymerization. The resulting dispersion was about 24 wt. % in solids concentration. To 500 ml of the dispersion obtained was added 500 ml of pure water, followed by full replacement of the interior air with 2F (vinylidene fluoride), the mixture was thereafter heated to 80° C. without addition of any initiator, and 2F was then supplied to a pressure of 22 kg/cm$^2$ G, whereupon polymerization was started. A pressure drop of 2.4 kg/cm$^2$ G occurred 50 minutes later, whereupon the system was rapidly cooled and relieved of pressure to discontinue the polymerization. The product was an aqueous dispersion containing 15 wt. % of solid content. The dispersion was coagulated by freezing, washed with water and dried. The polymer obtained was a rubberlike powder of low tackiness and was found to be 1.26 (dl/g 35° C.) in intrinsic viscosity (η) as measured using dimethylformamide as a solvent. The polymer contained 9.7 wt. % of 2F (vinylidene fluoride) segment (a) and was soluble in hot acetone.

PREPARATION EXAMPLE 2

A block copolymer was prepared from a copolymer of 2F (vinylidene fluoride)/4F (tetrafluoroethylene) in the ratio of 70/30 used as the segmented polymer chain (a) and a copolymer of 2F (vinylidene fluoride)/4F (tetrafluoroethylene)/6F (hexafluoropropylene) in the ratio of 50/20/30 used as the segmented polymer chain (b).

Into a pressure-resistant reactor with a capacity to contain 6000 parts of water were placed 3000 parts of pure water and 3 parts of ammonium perfluorooctanoate, the air in the interior space was fully replaced with pure nitrogen gas, and a gas mixture of 2F (vinylidene fluoride)/6F (hexafluoropropylene)/4F (tetrafluoroethylene) (20/69/11 in mole ratio) was thereafter supplied to the reactor to a pressure of 15 kg/cm$^2$ G at 80° C. with stirring. When 4 parts of 1% of aqueous APS solution was forced into the reactor, a pressure drop occurred immediately, so that the reaction was continued while supplying a gas mixture of 2F (vinylidene fluoride)/6F (hexafluoropropylene)/4F (tetrafluoroethylene) (50/30/20 in mole ratio) for the maintenance of pressure. When 2 parts of reaction mixture was obtained, 3.1 parts of I(CF$_2$)$_4$I was forced in, followed by a further reaction for 15 hours while forcing in 2 parts of 1% aqueous APS solution every 3 hours. The reaction system was thereafter rapidly cooled and relieved of pressure to terminate the reaction, affording a white aqueous dispersion containing about 25 wt. % of solids. This dispersion was coagulated by a line mixer having a great shearing force. The coagulant was washed with water and dried, giving a colorless elastic polymer having an intrinsic viscosity ($\eta$) of 0.45 (dl/g, 35° C., MEK).

A 1500 ml quantity of the dispersion obtained was placed into a reactor with a capacity of 3000 ml, the air in the interior space was fully replaced with 4F (tetrafluoroethylene), and a gas mixture of 2F (vinylidene fluoride)/4F (tetrafluoroethylene) (90/10 in mole ratio) was thereafter supplied to the reactor to a pressure of 15 kg/cm$^2$ G at 80° C. with stirring. When 10 ml of 0.1% of aqueous APS solution was forced in, a pressure drop occurred immediately, so that the reaction was continued while maintaining the pressure with a gas mixture of 2F (vinylidene fluoride)/4F (tetrafluoroethylene) (70/30 in mole ratio). The reaction was terminated by cooling the reaction system and relieving the system of pressure 3.5 hours later when the ratio of the same copolymer segment (a) to a rubber segment (b) reached 15 wt. %. The resulting aqueous dispersion was coagulated with 2% aqueous solution of magnesium chloride, followed by washing with water and drying, giving a powder in the form of fine particles. DSC analysis of the powder revealed an endothermic change at about 145° C. due to the melting of copolymer crystals.

COMPARATIVE PREPARATION EXAMPLE 1

A vinylidene fluoride-hexafluoropropylene copolymer was prepared from mixture of 2F (vinylidene fluoride) and 6F (hexafluoropropylene) in the ratio of 80/20.

Into a pressure-resistant reactor with a capacity of 3000 ml were placed 1500 ml of pure water and 7.5 g of ammonium perfluorooctanoate, the air in the interior space was fully replaced with a gas mixture of 2F (vinylidene fluoride)/6F (hexafluoropropylene) (45/55 in mole ratio), and the gas mixture was thereafter supplied to the reactor to a pressure of 14 kg/cm$^2$ G. A 5 ml quantity of ethyl acetate (25° C.) was placed in, the temperature was adjusted to 80° C. with stirring, and 100 ml of 10% aqueous APS solution was forced into the reactor. This immediately initiated a polymerization reaction to result in a pressure drop, so that a gas mixture of 2F (vinylidene fluoride)/6F (hexafluoropropylene) (80/20 in mole ratio) was supplied again to a pressure of 15 kg/cm$^2$ G upon the pressure dropping to 13 kg/cm$^2$ G. Continued polymerization was thereafter effected while maintaining the pressure in the range of 13 to 15 kg/cm$^2$ G in this way. Ten hours later, the reaction system was rapidly cooled and relieved of pressure to discontinue the polymerization. The resulting reaction mixture was about 20 wt. % in solids concentration. The reaction mixture was coagulated by freezing, followed by washing with water and drying, giving a rubber, which was found to be 0.34 (dl/g 35° C.) in intrinsic viscosity ($\eta$) as measured using methyl ethyl ketone as a solvent.

COMPARATIVE PREPARATION EXAMPLE 2

Polyvinylidene fluoride was prepared by polymerizing vinylidene fluoride.

Into a pressure-resistant reactor with a capacity of 2000 ml were placed 1000 ml of pure water, 0.8 g of methylcellulose, 3 g of ethyl acetate, 4 g of diisopropyl peroxycarbonate and 390 g of vinylidene fluoride to effect suspension polymerization at 25° C. for 25 hours. On completion of the reaction, the system was relieved of pressure, and the resulting slurry was dewatered, washed and dried at 80° C. for 20 hours, giving a polymer, which was found to be 1.43 (dl/g 25° C.) in intrinsic viscosity ($\eta$) as measured using dimethylformamide as a solvent.

EXAMPLE 1

Ionic Conductivity Measurement

The block copolymer prepared in Preparation Example 1 was made into a 100-$\mu$m-thick sheet by hot pressing. On the other hand, an electrolyte was prepared by dissolving LiPF$_6$ in propylene carbonate at a concentration of 1 mole/liter.

A sample of the sheet was placed into a circular glass dish with an inside diameter of 2 cm, 20 mg of the electrolyte was further placed in, and the sample was allowed to stand overnight in an argon atmosphere at 60° C.

When taken out after standing, the sample was found to be swollen with the electrolyte, remaining in the form of a sheet.

The sheet was checked for ionic conductivity by the usual a.c. impedance method at a frequency of 20 Hz to 1 kHz using an impedance analyzer (Model 1260) manufactured by SOLARTRON. The ionic conductivity of the sheet was $3 \times 10^{-4}$ S/cm.

EXAMPLE 2

Ionic Conductivity Measurement

The block copolymer prepared in Preparation Example 2 was made into a 100-$\mu$m-thick sheet by hot pressing. On the other hand, an electrolyte was prepared by dissolving LiPF$_6$ in propylene carbonate at a concentration of 1 mole/liter.

A sample of the sheet was placed into a circular glass dish with an inside diameter of 2 cm, 20 mg of the electrolyte was further placed in, and the sample was allowed to stand overnight in an argon atmosphere at 60° C.

When taken out after standing, the sample was found to be swollen with the electrolyte, remaining in the form of a sheet.

The sheet was checked for ionic conductivity by the usual a.c. impedance method at a frequency of 20 Hz to 1 kHz using an impedance analyzer (Model 1260) manufactured by SOLARTRON. The ionic conductivity of the sheet was $4 \times 10^{-4}$ S/cm.

COMPARATIVE EXAMPLE 1

The copolymer resin prepared in Comparative Preparation Example 1 was made into a 100-$\mu$m-thick sheet by hot pressing. On the other hand, an electrolyte was prepared by dissolving LiPF$_6$ in propylene carbonate at a concentration of 1 mole/liter.

A sample of the sheet was placed into a circular glass dish with an inside diameter of 2 cm, 20 mg of the electrolyte was further placed in, and the sample was allowed to stand overnight in an argon atmosphere at 60° C.

After standing, the sample was too low in strength to take out of the dish although attempted.

COMPARATIVE EXAMPLE 2

The homopolymer prepared in Comparative Preparation Example 2 was made into a 100-μm-thick sheet by hot pressing. On the other hand, an electrolyte was prepared by dissolving $LiPF_6$ in propylene carbonate at a concentration of 1 mole/liter.

A sample of the sheet was placed into a circular glass dish with an inside diameter of 2 cm, 20 mg of the electrolyte was further placed in, and the sample was allowed to stand overnight in an argon atmosphere at 60° C.

When taken out after standing, the sample was found remaining in the form of a sheet, with the electrolyte partly left unabsorbed.

The sheet was checked for ionic conductivity by the usual a.c. impedance method at a frequency of 20 Hz to 1 kHz using an impedance analyzer (Model 1260) manufactured by SOLARTRON. The ionic conductivity of the sheet was $2 \times 10^{-5}$ S/cm.

EXAMPLE 3 AND COMPARATIVE EXAMPLE 3

A positive electrode composition was prepared from 60 parts by weight of $LiCoO_2$ serving as a positive electrode active material, 5 parts by weight of acetylene black as an electrically conductive agent and 5 parts by weight of a binder, i.e., the block copolymer of Preparation Example 1 (for Example 3) or polyvinylidene fluoride of Comparative Preparation Example 2 (for Comparative Example 3), and 30 parts by weight of N-methylpyrrolidone as a solvent, by mixing these ingredients in a ball mill for 10 hours. The composition was applied to opposite surfaces of aluminum foil having a thickness of 20 μm and serving as a positive electrode current collector to a thickness of 100 μm when dried, eventually dried at 120° C. and thereafter rolled to prepare a striplike positive electrode.

A negative electrode and a battery were prepared substantially by the processes disclosed in JP-A No. 201316/1995. More specifically, a negative electrode composition was prepared from 60 parts by weight of carbon black (10 m²/g in specific surface area), 5 parts by weight of a binder, i.e., the block copolymer of Preparation Example 1 (for Example 3) or polyvinylidene fluoride of Comparative Preparation Example 2 (for Comparative Example 3), and 35 parts by weight of N-methylpyrrolidone as a solvent, by mixing these ingredients in a ball mill. The composition was applied to opposite surfaces of copper foil having a thickness of 10 μm and serving as a negative electrode current collector to a thickness of 100 μm when dried, then dried at 120° C. and thereafter rolled to prepare a striplike negative electrode.

A spiral electrode unit was subsequently prepared by placing the striplike positive electrode and the striplike negative electrode over each other with a separator sandwiched therebetween, and winding up the superposed layers a large number of turns into a roll. The separator was prepared by forming the copolymer of Preparation Example 1 into a film having a thickness of 25 μm. The electrode unit was then placed into an iron cell can plated with nickel, with an insulating plate positioned at the bottom and top of the can. An aluminum lead extending from the positive electrode current collector was welded to a closure for the cell, and a nickel lead extending from the negative electrode current collector was welded to the can.

An electrolyte prepared by dissolving $LiPF_6$ at a concentration of 1 mole/liter in a solvent mixture of ethylene carbonate and diethyl carbonate in a volume ratio of 1:1 was poured into the cell can containing the electrode unit. A safety valve device having a current interrupting mechanism and the cell closure were secured to the cell can by crimping, with an insulating seal gasket having an asphalt surface coating fitted to the open end of the can, whereby a nonaqueous electrolyte secondary battery was fabricated in the form of a cylinder measuring 18 mm in diameter and 65 mm in height.

The cell fabricated was charged at a maximum voltage of 4.2 V and current of 1 A for 2.5 hours, then discharged through resistance of 6.2 Ω and thereafter subjected to this charge-discharge cycle repeatedly at room temperature to observe variations in discharge capacity and determine the number of cycles resulting in a reduction of discharge capacity to 50% of the initial capacity (50% capacity cycle number).

The cell wherein the block copolymer of Preparation Example 1 was used was 700 in 50% capacity cycle number, and the cell wherein the polyvinylidene fluoride of Comparative Example 2 was used was 500 in 50% capacity cycle number.

What is claimed is:

1. A polymer gel electrolyte for use in lithium secondary batteries comprising a copolymer having both a first segmented polymer chain (a) having the function of retaining membrane strength and a second segmented polymer chain (b) having the function of holding a nonaqueous electrolyte, wherein the first segmented polymer chain (a) and the second segmented polymer chain (b) are different and are each a homopolymer or copolymer of at least one monomer selected from the group consisting of vinyl fluoride, vinylidene fluoride, trifluoroethylene, tetrafluoroethylene, hexafluoropropylene, chlorotrifluoroethylene, vinyl ether perfluoride, 2,3,3,4,4,5,5-heptafluoro-1-pentene and the monomers further having a functional group on a side chain, or a copolymer of at least one monomer selected from the monomer group, and ethylene and/or propylene.

2. A polymer gel electrolyte for use in lithium secondary batteries according to claim 1 wherein the copolymer is a block copolymer or graft copolymer.

3. A lithium secondary battery comprising a polymer gel electrolyte according to claim 1, and further comprising:

(1) a lithium salt capable of disassociation and selected from the group consisting of $LiPF_6$, $LiBF_4$, $LiClO_4$, $LiAsF_6$, $LiCF_3SO_3$, $Li(CF_3SO_2)_2N$, $Li(CF_3SO_2)_3C$ and $LiSbF_6$, and (2) a solvent selected from the group consisting of ethylene carbonate, propylene carbonate, butylene carbonate, dimethyl carbonate, diethyl carbonate, methylethyl carbonate, dipropyl carbonate, γ-butyrolactone, dimethoxyethane, diethoxyethane and mixtures of such solvents.

4. A binder for use in lithium secondary batteries which comprises a copolymer having in the molecule both a first segmented polymer chain (a) having the function of retaining membrane strength and a second segmented polymer chain (b) having the function of holding a nonaqueous electrolyte, wherein the first segmented polymer chain (a) and the second segmented polymer chain (b) are different and are each a homopolymer or copolymer of at least one monomer selected from the group consisting of vinyl fluoride, vinylidene fluoride, trifluoroethylene, tetrafluoroethylene, hexafluoropropylene, chlorotrifluoroethylene, vinyl ether perfluoride, 2,3,3,4,4,5,5-heptafluoro-1-pentene and the monomers further having a functional group on a side chain, or a copolymer of at least one monomer selected from the monomer group, and ethylene and/or propylene.

* * * * *